United States Patent
Small

(10) Patent No.: US 11,152,802 B1
(45) Date of Patent: Oct. 19, 2021

(54) PORTABLE BATTERY CHARGER WITH SAFETY FEATURES

(71) Applicant: Ray Small, Windsor, CT (US)

(72) Inventor: Ray Small, Windsor, CT (US)

( * ) Notice: Subject to any disclaimer, the term of this patent is extended or adjusted under 35 U.S.C. 154(b) by 16 days.

(21) Appl. No.: 16/864,066

(22) Filed: Apr. 30, 2020

(51) Int. Cl.
| H01M 10/46 | (2006.01) |
| H02J 7/00 | (2006.01) |
| F41H 9/10 | (2006.01) |
| H04B 1/20 | (2006.01) |
| H01M 50/20 | (2021.01) |
| H01M 50/24 | (2021.01) |

(52) U.S. Cl.
CPC .............. *H02J 7/0044* (2013.01); *F41H 9/10* (2013.01); *H01M 10/46* (2013.01); *H01M 50/20* (2021.01); *H01M 50/24* (2021.01); *H04B 1/20* (2013.01); *H02J 2207/30* (2020.01)

(58) Field of Classification Search
CPC ...... H02J 7/0044; H02J 7/0042; H02J 7/0045; F41H 9/10; H01M 50/24
USPC ................... 320/107, 112, 114; 239/87, 302; 514/627
See application file for complete search history.

(56) References Cited

U.S. PATENT DOCUMENTS

| 5,476,192 A * | 12/1995 | Julinot | B65D 83/384 116/81 |
| 8,771,085 B1 | 7/2014 | Clyde et al. | |
| 9,386,438 B2 | 7/2016 | Hymowitz | |
| 2008/0020794 A1* | 1/2008 | Garon | A61B 5/150022 455/556.1 |
| 2014/0252028 A1* | 9/2014 | Lord | F41H 9/10 222/79 |

* cited by examiner

*Primary Examiner* — Edward Tso
(74) *Attorney, Agent, or Firm* — Sanchelima & Associates PA; Christian Sanchelima; Jesus Sanchelima

(57) ABSTRACT

A portable battery charger having a battery assembly, a security assembly, and a communication assembly is disclosed. The battery assembly includes a rechargeable battery that is stored within a rectangular housing. The security assembly includes various security features that are stored within the housing such as a pepper spray dispenser and a high definition camera. Furthermore, the security assembly includes a voice recorder that clearly records audio from a surrounding area. Additionally, the video and audio that is captured is stored within an SD memory card that is inserted into the housing. The communication assembly includes a wireless communication module within the housing that connects to a mobile device through a Bluetooth connection.

12 Claims, 3 Drawing Sheets

PORTABLE BATTERY CHARGER WITH SAFETY FEATURES

BACKGROUND OF THE INVENTION

1. Field of the Invention

The present invention relates to a portable battery charger and, more particularly, to a portable battery charger that includes additional safety features such as a pepper spray dispenser and a high definition camera.

2. Description of the Related Art

Several designs for a portable battery charger have been designed in the past. None of them, however, include a portable battery charger having a battery assembly, a security assembly, and a communication assembly. The battery assembly includes a rechargeable battery that is stored within a rectangular housing. The security assembly includes various security features that are stored within the housing such as a pepper spray dispenser and a high definition camera. Furthermore, the security assembly includes a voice recorder that clearly records audio from a surrounding area. Additionally, the video and audio that is captured is stored within an SD memory card that is inserted into the housing. The communication assembly includes a wireless communication module within the housing that connects to a mobile device through a Bluetooth connection. Additionally, the mobile device may be provided with a software application that allows a user to stream real-time video and audio captured by the device. It is known that individuals often have a need for a portable charger to recharge their portable electronic devices. It is also known that individuals often carry security devices such as pepper spray and cameras to help protect themselves in the event of an emergency. For the sake of reducing the number of devices that are carried by a user, there is a need for a portable charger that is combined with security devices.

Applicant believes that a related reference corresponds to U.S. Pat. No. 9,386,438 issued for a method and apparatus for active defense and emergency response. The reference cites a deterrent device containing a first wireless communications link which is established with a mobile computing device. Applicant believes that another related reference corresponds to U.S. Pat. No. 8,771,085 issued for a modular law enforcement baton. The reference cites a law enforcement baton having at least two useful functions disposed at a first end and a second end. However, the cited references differ from the present invention because they fail to disclose the novel combination of a portable battery charger having additional security features such as a pepper spray feature and a high definition camera. The camera will automatically start recording in emergency situations such as when the pepper spray has been activated.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable charging device that includes a pepper spray and a high definition camera to provide added security features to a user.

It is another object of this invention to provide a portable charging device that automatically records video and audio from a surrounding area and further streams the audio and video to an electronic device.

It is still another object of the present invention to provide a portable charging device with a GPS tracking device which allows emergency responders to track an individual in need of emergency help.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
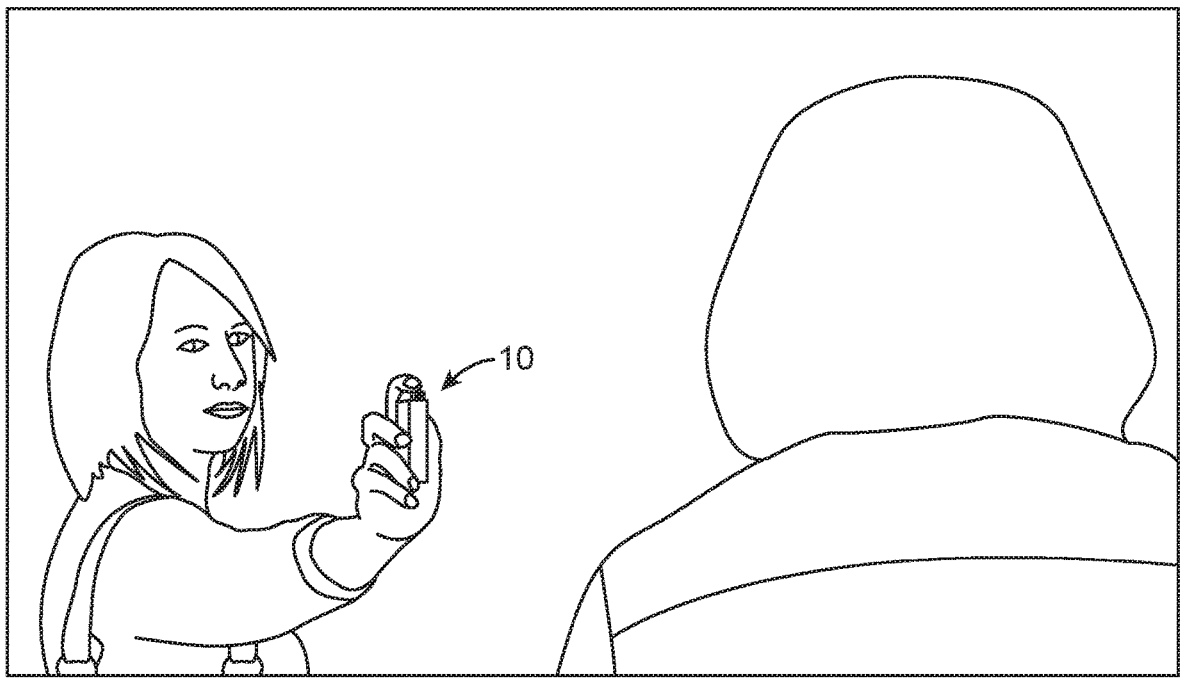
FIG. 1 represents an operational isometric view of portable battery charger 10 in accordance to an embodiment of the present invention.
Figure 2:
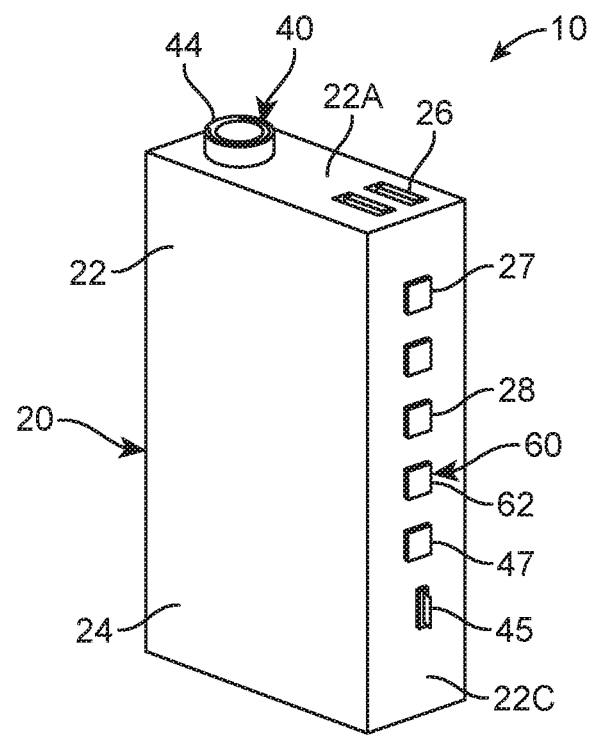
FIG. 2 shows an isometric view of portable battery charger 10 in accordance to an embodiment of the present invention.
Figure 3:
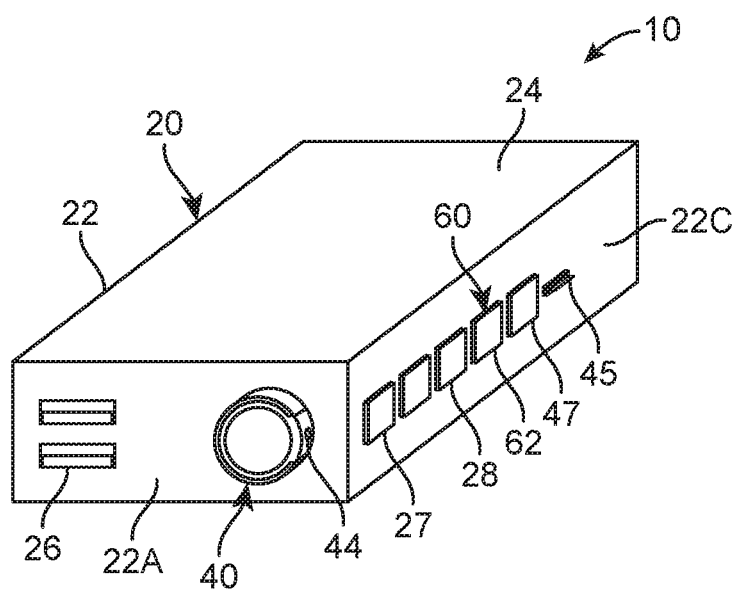
FIG. 3 illustrates an isometric top view of portable battery charger 10 depicting charging ports 26 of battery assembly 20 and a pepper spray nozzle 44 of security assembly 40 in accordance to an embodiment of the present invention.
Figure 4:
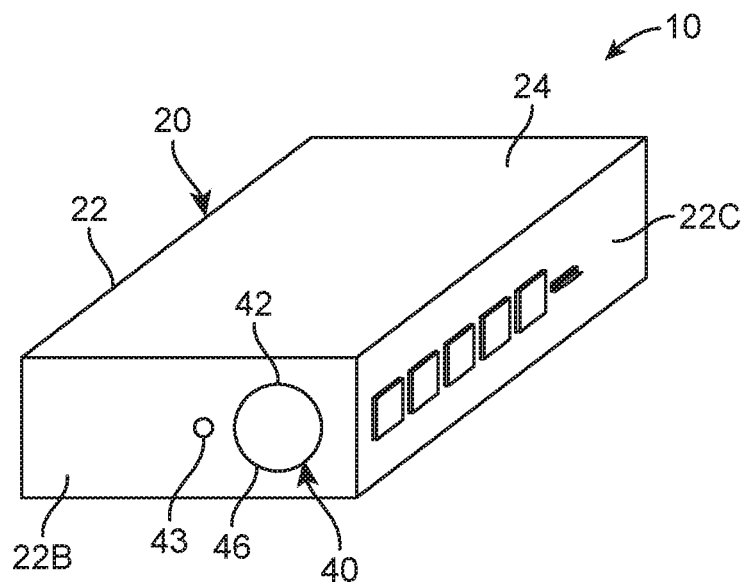
FIG. 4 is a representation of an isometric bottom view of portable battery charger 10 depicting camera 42 of security assembly 40 in accordance to an embodiment of the present invention.
Figure 5:
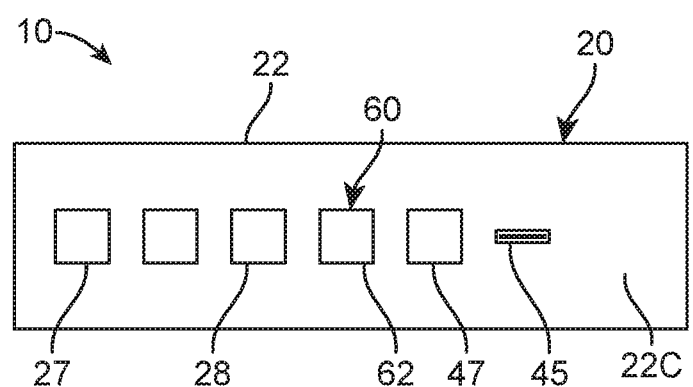
FIG. 5 shows a side view of portable battery assembly 10 depicting various components of communication assembly 60 in accordance with an embodiment of the present invention.

Referring now to the drawings, where the present invention is generally referred to with numeral 10, it can be observed a portable battery charger 10 which basically includes a battery assembly 20, a security assembly 40, and a communication assembly 60.

Battery assembly 20 includes a housing 22 having a top end 22A, a bottom end 22B, and a side face 22C. In one embodiment, housing 22 may be provided as having rectangular profile as observed in the provided figures. Additionally, housing 22 may be made of a strong and durable material such as metals, carbon fiber, and the like. Housing 22 is provided as a water, dirt, and oil resistant housing. Furthermore, housing 22 may be reinforced in order to withstand substantial blunt force trauma. Housing 22 further houses a rechargeable battery 24. In one embodiment, rechargeable battery 24 is provided as a battery that may be recharged through a wired means or a wireless means. In one implementation, rechargeable battery 24 will last for up to 72 hours allowing users to charge a variety of mobile devices. Additionally, rechargeable battery may last for 72 hours whether a user is charging various devices or using the security features of security assembly 40. A user may be able charge their mobile devices by plugging in their mobile device into ports 26. In one embodiment, ports 26 may be located on a top end 22A of housing 22. At least one port 26 must be provided for portable battery charger 10. Ports 26 may be provided as USB ports or USB-C ports. Other ports such as lighting cable ports may be used. In one implementation, ports 26 provide a way to charge the internal battery within portable battery charger 10. Ports 26 may additionally be used to charge external mobile devices.

Housing 22 further includes a power button 27 and a reset button 28 located along side face 22C. In one embodiment, power button 27 is a circular button which actuates portable battery charger 10 into an off state or an on state. When in the off state, features associated with the security assembly 40 may be disengaged in order to preserve the battery power of portable battery charger 10. While in the on state, the features from security assembly 40 may be automatically engaged. Furthermore, reset button 28 may be a circular button which clears a memory associated with security assembly 40. When this memory is overloaded, a user cannot store any more information, they may use the reset button to clear the memory. The memory is then cleared or securely off loaded into a user's mobile device through a wireless connection. In one embodiment, this memory is offloaded to an online web service storage system through a WIFI connection.

Security assembly 40 includes a camera 42 located on bottom end 22B of housing 22. In one embodiment, camera 42 is a USB/4K/UHD/1080p hidden camera that is flush with bottom end 22B. Camera 42 records visual media from a user's surrounding area. In one implementation, camera 42 may be activated manually by a user to begin recording data. In another implementation camera 42 may automatically begin to capture visual media in the event of an emergency. In this application, camera 42 may be activated through a trigger such as elevated movements or elevated decibel levels that may be captured through screams. It should be understood that any number of sensors such as audio sensors, motion sensors, light sensors, and the like may be included with portable battery charger 10 to achieve this. Additionally, camera 42 includes a UHD night vision lens which allows it to capture video in a dark environment. Furthermore, camera 42 includes a motion tracker which may track moving objects when recording such as people, body, animals and the like. Security assembly 40 may further include a microphone 43 located on bottom end 22B of housing 22 next to camera 42. Microphone 43 may be provided in the form of a digital voice recorder to record audio media. Similar to camera 42, microphone 43 may be activated manually or automatically in emergency situations. Additionally, microphone 43 may be provided with 2-way noise cancellation to be able to capture a variety of sounds with optimum clarity during playback.

The visual media and audio media captured by camera 42 and microphone 43 may be stored within an SD card 45 that is mounted into an SD card slot of housing 22. In one embodiment, this SD card slot is located along side face 22C of housing 22. Additionally, SD card may support up to 64-128 gigabytes of storage. In one implementation, newly recorded audio and visual media will overwrite the oldest unprotected files when the memory is full. In another implementation, reset button 28 may be used to clear the memory of SD card 45 when the memory is at capacity. In one embodiment, portable battery charger 10 may be provided with an emergency video lock which automatically locks data stored within SD card during emergency situations. When this lock is engaged, certain locked data within SD card will not be overwritten in the event that memory is at its limit or a rest takes place by a user.

Security assembly 40 further includes a pepper spray nozzle 44 located on top end 22A of housing 22. In one embodiment, pepper spray nozzle 44 allows a user to engage a pepper spray mixture that is housed within housing 44. This pepper spray mixture may be a refillable mixture within housing 22 that may be used to ward off an oncoming threat. One example, a user may engage pepper spray nozzle 44 in the event of an attempted robbery. Pepper spray nozzle 44 may be provided in several configurations. In one configuration, pepper spray nozzle 44 may protrude outwardly from housing 22. In another configuration, pepper spray nozzle 44 may be hidden entirely within housing 22 to only be engaged in the event of an emergency situation.

Security assembly 40 may also include a flashlight 46 which is located within the same area as camera 42. In one embodiment, flashlight 46 and camera 42 may not be used simultaneously. A user must decide between using flashlight 46 and camera 42. Additionally, flashlight 46 may be provided as an LED hardware that provides a bright light for a user to maintain clarity in a dark environment. Security assembly 40 further includes a GPS tracker 47 which includes precision point positioning to track the location of a user. In the event of an emergency, a location of a user may be broadcasted to a mobile device notifying another user of the emergency. In one embodiment, the location is shared to local law enforcement where they may be able to track the location of the emergency in order to respond accordingly. This information may be broadcasted through a WIFI connection.

Communication assembly 60 includes a wireless communication module 62 stored within housing 22. In one embodiment, communication module 62 allows portable battery charger 10 to be paired with a mobile device through a Bluetooth connection. In other embodiments, other various forms of connection may be used such as LTE and WIFI. Additionally, portable battery charger 10 communicates with a mobile device through a downloadable software application. This software application allows a user to stream real time video to the mobile device, personal computer, tablets and other devices. In one implementation this stream of data occurs automatically in the event of an emergency situation.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a portable battery charger, comprising:
   a. a battery assembly including a housing having a top end, a bottom end, and a side face, said housing houses a rechargeable battery, ports in communication with said rechargeable battery located on said top end; and
   b. a security assembly including a camera located on said bottom end of said housing, wherein said camera records visual media to be stored on an SD card mounted to said housing, a pepper spray nozzle located on said top end, said pepper spray nozzle dispenses a pepper spray when actuated.
2. The system for a portable battery charger of claim 1 wherein said housing includes a power button on said side face to actuate said portable battery charger into an off state or an on state.

3. The system for a portable battery charger of claim 1 wherein said housing includes a reset button located on said side face which clears a memory stored within said SD card.

4. The system for a portable battery charger of claim 1 wherein said ports includes a USB port, a USBC port, or a lightning port.

5. The system for a portable battery charger of claim 1 wherein said security assembly further includes a microphone which records audio media to then be stored within said SD card.

6. The system for a portable battery charger of claim 5 wherein said microphone is a digital voice recorder.

7. The system for a portable battery charger of claim 1 wherein said pepper spray nozzle is housed entirely within said housing.

8. The system for a portable battery charger of claim 1 wherein said security assembly further includes a precision point positioning GPS tracking device.

9. The system for a portable battery charger of claim 8 wherein said precision point positioning GPS tracking device shares a location of said housing to a mobile device through a Wi-Fi connection.

10. The system for a portable battery charger of claim 1 further including a communication assembly having a wireless communication module.

11. The system for a portable battery charger of claim 1 wherein said wireless communication module communicates to a mobile device through a wireless connection.

12. A system for a portable battery charger, comprising:
a. a battery assembly including a rectangular housing having a top end, a bottom end, and a side face, wherein said rectangular housing houses a rechargeable battery, said rectangular housing having ports located on said top end, wherein said ports are a USB port, a USBC port, and a lightning port, said side face including a power button and a reset button;
b. a security assembly including a camera located on said bottom end, a microphone located on said bottom end, wherein said microphone is a digital voice recorder, wherein said camera and said microphone automatically begins recording in the event of an emergency situation, a pepper spray nozzle located on said top end, said dispensing a pepper spray when actuated, an SD card mounted within said side face, wherein said SD card stores audio and video media captured by said camera and said microphone, a flash component located on said top end, a precision point positioning GPS tracking device within said housing, wherein a location of said housing is shared with a mobile device; and
c. a communication assembly including a wireless communication module to connect to said mobile device, wherein said wireless communication module provides a wireless connection.

\* \* \* \* \*